United States Patent [19]

Bryce, Jr.

[11] Patent Number: 4,585,382

[45] Date of Patent: * Apr. 29, 1986

[54] EASILY REMOVABLE RIVET WITH TAB

[75] Inventor: William D. Bryce, Jr., Seymour, Conn.

[73] Assignee: USM Corporation, Farmington, Conn.

[*] Notice: The portion of the term of this patent subsequent to Sep. 17, 2002 has been disclaimed.

[21] Appl. No.: 556,987

[22] Filed: Dec. 1, 1983

[51] Int. Cl.⁴ .................................. F16B 13/04
[52] U.S. Cl. .................................... 411/34; 411/42; 411/501
[58] Field of Search .................... 411/34–38, 411/39–43, 55, 57–62, 70, 476, 486, 500–507; 220/272, 273

[56] References Cited

U.S. PATENT DOCUMENTS

| 414,682 | 11/1889 | Cummings | 411/501 |
| 3,291,336 | 12/1966 | Fraze | 220/273 |
| 3,515,028 | 6/1970 | Patton | 411/70 |
| 4,182,460 | 1/1980 | Holk, Jr. et al. | 220/273 |
| 4,436,467 | 3/1984 | Larsson et al. | 411/34 |

FOREIGN PATENT DOCUMENTS 2077383 12/1981 United Kingdom ............... 411/500

Primary Examiner—Thomas J. Holko
Assistant Examiner—Neill Wilson
Attorney, Agent, or Firm—Alan N. McCartney

[57] ABSTRACT

An easily removable blind rivet of the type having an open rivet body with a flange on one end and a mandrel positioned within the opening in the rivet body, the mandrel having an enlarged head at one end adapted to upset the rivet body when the mandrel is pulled. The rivet is assembled with a separate strip of material surrounding the rivet body below the flange, the strip of material is adapted to be pulled so that the rivet flange can be removed from the rivet body enabling the rivet body to be passed through the opening in a workpiece.

5 Claims, 5 Drawing Figures

EASILY REMOVABLE RIVET WITH TAB

BACKGROUND OF THE INVENTION (1) Field of the Invention

This invention relates to blind rivet assemblies and particularly blind rivets which can be easily removed from the workpiece or workpieces after being installed.

(2) Summary of the Prior Art

There are several different types of blind rivets on the market. These rivets generally comprise a hollow rivet body having a flanged head. A mandrel is passed through the body with a head on a mandrel stem positioned adjacent the open end of the rivet body opposite the flanged head. Another type of blind rivet has a rivet body which is closed at the end opposite the flanged head, and the mandrel head is enveloped in the closed end of the rivet body. These are called closed end rivets. With either type, the rivet body can then be inserted into the opening in a workpiece wherein the flange of the rivet lies flat against the surface of the workpiece. By placing the nosepiece of a rivet setting tool adjacent the rivet flange, and by pulling on the mandrel stem, the head of the mandrel upsets the rivet body on the opposite side of the workpiece to deform the rivet and secure it within the workpiece. This process is generally known in the art as "setting" the rivet. A continued pulling of the mandrel stem will break off the mandrel head with the removed mandrel stem passing through the rivet body. In this fashion, the rivet is secured in the opening of the workpiece between the rivet flange on one side of the workpiece and the deformed rivet body on the opposite side of the workpiece from the rivet flange.

Examples of rivets of these types and tools for setting the rivets are illustrated in U.S. Pat. Nos. 3,254,522; 3,302,444 and 3,324,700, and 2,779,955.

BRIEF SUMMARY OF THE INVENTION

In the aforementioned blind rivet devices and their application to workpieces, it is the major intention that the rivet and workpieces become permanently attached.

There are, however, some applications for such blind rivets where it is desirable to merely provide a temporary attachment between the workpieces. Therefore, it would be desirable to have an easily removable blind rivet. For example, as illustrated and discussed herein, it may be desirable to secure two metal workpieces together in a proper predetermined relation so that the workpieces could be permanently welded together. Thereafter it may be desirable to remove the temporary securing means.

It is therefore an object of this invention to provide an easily removable blind rivet.

It is a further object of this invention to locate in a blind assembly a thin metal sheet of material between the rivet flange and the workpiece that can be used to remove the rivet flange so the rivet can be passed through the opening in the workpiece.

It is another object of this invention to provide a blind rivet with a relieved area between the rivet body and the flange which will localize an area of weakness facilitating the separation of the body from the flange. A thin strip of material surrounds the rivet body adjacent the flange which can be pulled to remove the flange from the rivet body.

These and other objects of this invention will become more apparent from the accompanying description along with the drawing.

DESCRIPTION OF THE PREFERRED EMBODIMENT

Figure 1:
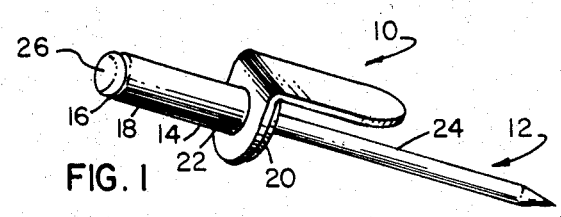
FIG. 1 is an illustration of the blind rivet assembled on a mandrel with the flange removing strip surrounding the rivet body.
Figure 2:
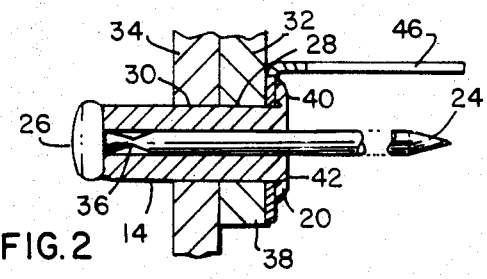
FIG. 2 is an illustration of the blind rivet assembly positioned through the openings in workpieces.

Attention is now directed to FIG. 1 which illustrates the blind rivet assembly 10 with a mandrel 12. The rivet contains a cylindrical open body portion of 14 having an opening 16 on one end 18 and a flange 20 on the opposite end 22.

The mandrel 12 contains an elongated stem 24 terminating in a head portion 26. The elongated stem 24 is approximately the same diameter as the diameter of the opening 16 in rivet body portion 14. The stem 24 is adapted to pass through the opening 16 until the mandrel head portion 26 abuts the end 18 of the rivet body 14, as illustrated.

In the above described assembled condition the blind rivet 10 is adapted, for example, to be inserted into openings 28 and 30 of workpiece 32 and 34. The openings 28 and 30 are the approximate diameter of the diameter of the body portion 14 of the rivet 10.

Figure 3:
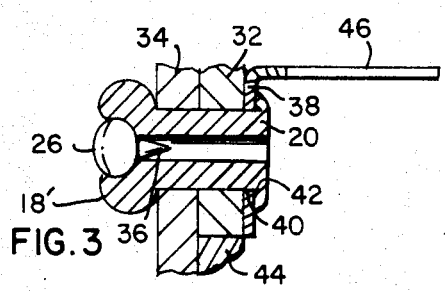
FIG. 3 is an illustration of the blind rivet in a "set" condition in the workpieces.

In the operation of setting the conventional rivet thus far described, the nosepiece (not shown) of a rivet setting tool of the type described in U.S. Pat. No. 3,254,522 is placed adjacent the flange 20 of the rivet. The mandrel stem 24 is then pulled so that the mandrel head portion 26 is forced against the end 18 of the rivet body 14 to upset the rivet body 14 in the conventional manner, as illustrated in FIG. 3. Normally there is a reduced neck area 36 between the mandrel stem 24 and head portion 26. As the stem 24 is pulled, the mandrel breaks at the neck area 36 so that the stem 24 is removed and the head portion 26 is retained in the deformed end 18 of the rivet body 14.

In U.S. patent application Ser. No. 535,436 filed Sept. 26, 1983 there is disclosed a blind rivet having a flange with a portion formed out of the surface of the flange which can be gripped so that the flange can be removed from the rivet body. This is one novel manner of providing an easily removable blind rivet.

The improved novel manner of providing an easily removable rivet assembly disclosed herein is by providing a thin strip of material surrounding the rivet body adjacent the rivet flange which can be pulled to strip the flange from the rivet body.

The thin strip of sheet material 38 has an opening 40 surrounding the body portion 14 of the rivet and is adapted to be placed adjacent the flange 20. As illustrated in the drawing, the material 38 is positioned between the flange 20 and the workpiece and when the rivet is set the material 38 will be securely retained between the flange and the workpiece. Attention is also directed to the undercut or relieved area 42 in the flange 20 between the flange 20 and the body portion 14 of the rivet.

Figure 4:
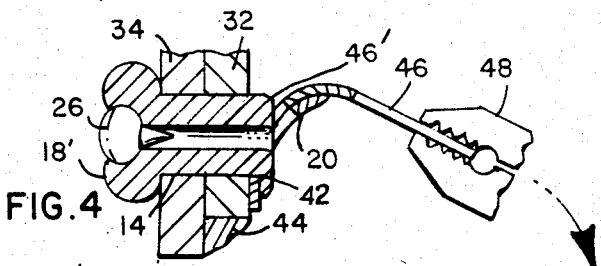
FIG. 4 is an illustration of the blind rivet in the workpieces with the flange of the rivet being removed by pulling the flange removing strip.
Figure 5:
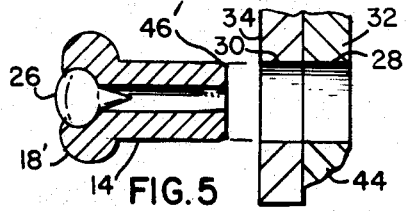
FIG. 5 is an illustration of blind rivet with the flange removed and the rivet body passed through the openings in the workpieces.

When the rivet is formed or set as illustrated in FIG. 3, the flange 20 of the rivet can be removed by pulling the tab 46 extending upwardly from the strip of material 38 by means of any conventional gripping tool such as pliers 48 (see FIG. 4). In this fashion, the rivet flange 20 can be removed from the rivet body portion 14 so that the rivet can be passed through the openings 28 and 30 of the workpieces 32, 34. The relieved area 42 between the flange 20 and the rivet body 14 provides a localized area of weakness at which the separation of the flange 20 and body 14 occurs as shown at 46' (see FIGS. 4 and 5). Since the flange 20 is removed from the body 14 at the area 42, a portion of the body 14 extends beyond the surface of the workpiece. Thereafter, the exposed end of the rivet body 14 can be struck to free the rivet body 14 from the openings 28, 30 to remove the rivet body from the workpiece.

An application of the rivet assembly of this invention is illustrated in the drawing wherein the workpieces 32, 34 are temporarily secured together by the rivet assembly. Thereafter, the workpieces can be permanently secured by a weld 44. Thus, it can be seen that the rivet assembly can be utilized to temporarily secure two workpieces in a predetermined relationship for permanently securing them together. Thereafter, the rivet assembly can be removed in the manner described so as not to be a hindrance to the assembled workpieces or the surfaces of the workpieces against which additional operations may have to be performed. Additionally, it may be desirable to utilize the free openings 28, 30 for securing other members to the workpieces.

Another application for the above described invention is an environment wherein it is desirable to periodically replace a worn working member secured to the workpiece. An illustration of this application of the rivet is to secure a transformer to a printed circuit board. Periodically the transformer becomes inefficient or inoperative. Once the transformer is secured to the printed circuit board or other support wherein it is being used, and the transformer becomes non-functional, it can be easily removed from the board by removing the flange 20 from the rivet 10 by removing pull tab 46 attached to strip 38. Thereafter, a replacement transformer can be attached to the board by another set of rivets of the type of the invention described herein.

An additional application of the blind rivet of this invention is to hold glued workpieces together while an adhesive cures.

I claim:

1. A blind rivet assembly adapted to be placed through an opening in a workpiece comprising:
   a. a rivet having a hollow body portion and an interconnected flange normal to said body portion, said body portion having an uninterrupted outer surface merging into a localized area of weakness at said flange that extends into the surface of said flange;
   b. a mandrel having a head and an elongated stem with a continuous uninterrupted outer surface, said mandrel being inserted into said rivet body portion with the mandrel stem extending beyond said flange;
   c. said mandrel stem being adapted to be pulled to upset said rivet body portion so that said flange would rest against one surface of the workpiece and the upset rivet body portion against the opposite surface of the workpiece while the rivet body portion and said flange remain interconnected;
   d. separate means adapted to be placed under said head portion and secured between said head portion and the workpiece which when removed will strip said flange portion from said body portion along said localized area of separation so that said body portion can be passed thorough the opening in the workpiece and the rivet removed from the workpiece.

2. A blind rivet assembly adapted to be placed through the opening in a workpiece to be secured thereto;
   a. a rivet having a hollow uninterrupted body portion and an interconnected flange normal to the body portion;
   b. a mandrel having a head and an elongated stem projecting from said flange;
   c. said mandrel stem being adapted upon pulling said stem, to upset said rivet body portion so that the rivet flange would rest against one surface of a workpiece and the upset rivet body against the opposite surface of a workpiece with said rivet body portion and said flange remaining intact;
   d. said interconnection of said flange and said body portion of the rivet has a reduced area extending into said flange to provide a localized area of separation of the said flange from said body portion;
   e. separate means adapted to be placed under said head portion and secured between said head portion and the workpiece which when removed will strip said flange portion from said body portion along said localized area of separation so that said body portion extends beyond the surface of the workpiece and can be passed through the opening in the workpiece and the rivet removed from the workpiece.

3. The blind rivet assembly of claim 2 wherein said separate means is a thin sheet of material having an opening surrounding said body portion and adapted to be positioned between said flange portion and the workpiece.

4. The blind rivet assembly of claim 3 wherein said material includes an upwardly extending tab accessible to a tool to assist in the removal of said material to strip said rivet flange from said rivet body portion.

5. The blind rivet assembly of claim 2 wherein said means includes a strip of material adapted to be located between said rivet flange and the workpiece which when removed will strip said rivet flange from said rivet body portion so that the rivet body portion can be passed through the opening in the workpiece and the rivet removed from the workpiece.

* * * * *